Patented Oct. 31, 1944

2,361,473

UNITED STATES PATENT OFFICE 2,361,473

CAMOUFLAGE

Walter C. Granville, New York, N. Y., assignor to Interchemical Corporation, New York, N. Y., a corporation of Ohio No Drawing. Application July 8, 1942, Serial No. 450,139

14 Claims. (Cl. 106—287)

This invention relates to camouflage, and it is especially directed to a paint or coating composition which is characterized by its similarity to vegetation with respect to reflection of light throughout the visible and into the infra-red region of the spectrum.

It is known that grass, leaves and foliage in general reflect a large proportion of energy in the infra-red region in addition to the visible light, and this is true even when the vegetation has lost its characteristic green color or was naturally of a different shade. The increasing use of infra-red photography in military reconnaisance makes it necessary to employ paints for camouflage which have substantially the same spectral reflectance throughout the entire visible spectrum and well into the infra-red region as has the foliage for which the paint is intended to be mistaken. Although some pigmented compositions will reflect infra-red energy to a greater extent than visible light they are not necessarily suitable for camouflage because the spectral reflectance characteristics of vegetation are not only high in the infra-red region of the spectrum but they show a peculiar, sharp absorption at the long wave end of the visible spectrum (i. e. 680 to 730 mu. wave length).

This invention provides a coating composition which may be used to match any color of foliage from the lightest green through darker shades to olive and even brown, and will exhibit substantially the same spectral reflectance characteristics as the foliage it matches, throughout the visible spectrum and extending well into the infra-red region.

The pigment composition of this invention depends for its infra-red reflectance characteristics on the inclusion of certain deep blue colorants, the particular visible shade of the composition being adjusted by the addition of various other colorants generally of red to yellow color. In practice, it is usually desirable to add various amounts of white or inert pigments to increase the reflectivity and opacity of the composition and to take advantage of the strong coloring power of these colorants.

The colorants on whose characteristics this invention is based are the deep blues obtained by coupling tetrazotized dianisidine with beta oxy naphthoic acid and certain arylamides of beta oxy naphthoic acid. The colorants which come within this group are the only ones so far known which exhibit the sharp spectral absorption characteristics in the region considered together with the necessary characteristics in the visible region. The spectral absorption characteristics of these blues may be described as having a major transition from maximum light absorption to maximum transmittance occurring in the wave length region from about 680 to about 730 mu., a high degree of transmittance in the wave length region from about 740 to about 900 mu., the maximum absorption falling within the range of about 670 to about 690 mu. and showing increasing transmittance from the point of maximum absorption to about 450 mu. However, most of these colorants are lacking in light fastness so that their use in camouflage coatings is extremely limited and is often entirely impracticable. We have discovered that there is a small group of colorants within the larger group described which not only have spectral absorption characteristics very similar to that of natural foliage in the region from 600 to 730 mu., but they also are sufficiently light-fast to make them useful in the ordinary camouflage coatings.

The colorants of the light-fast group are obtained by coupling tetrazotized dianisidine with beta oxy naphthoic acid, the anilide of beta oxy naphthoic acid or with alkoxy substituted anilides of beta oxy naphthoic acid, of which the latter are the most light-stable. In many cases metallizing the colorant produces even further light fastness and for this purpose copper and nickel are preferred. Of this group of colorants five have been found which are particularly good. They are the compounds resulting from the coupling of dianisidine with beta oxy naphthoic acid, the anilide, the o-anisidide, the o-phenetidide and the 2,5 dimethoxy anilide of beta oxy naphthoic acid.

Any of the commonly known yellow and red colorants which are sufficiently light-fast, may be mixed with the blues described above to produce various shades of greens and browns. For this purpose, yellows and reds of the cadmium and iron oxide series and some yellows of the Hansa series, especially the compounds resulting from the coupling of azotized arylmonoamines with acetoacetic arylamides, are suitable.

Although the preparation of particular camouflage compositions is apparent from the above description, a typical formulation which produces a color approximating Greens Nos. 1 and 2 of the U. S. Army Engineer Board Specification T-1213 is as follows:

The proportions are based on the dry pigment weight.

| | Per cent |
|---|---|
| Blue pigment | 15 |
| Cadmium yellow (light orange No. 1482 Kentucky Color & Pigment Co.) | 50 |
| Titanium dioxide (chalk resistant) | 35 |

The above pigment mixture can be dispersed in any conventional vehicle, such as oleoresinous varnishes, long oil alkyd varnishes, nitrocellulose lacquers and the like.

The blue pigment used in this formulation was tetrazotized dianisidine coupled with the 2,5 dimethoxy anilide of beta oxy naphthoic acid.

Other variations and modifications will be apparent to those skilled in the art, and the invention should not be limited other than as defined in the appended claims.

I claim:

1. Coating composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising a material whose major transition from maximum light absorption to maximum transmittance occurs in the wave length region from about 680 to 730 mu., said material being substantially transparent in the wave length region from about 740 to about 900 mu., having the maximum absorption falling within the range of about 670 to 690 mu. and being of increasing transmittance from the point of maximum absorption down to about 450 mu., said material comprising a blue colorant of the group consisting of the compound formed by coupling tetrazotized dianisidine with a member selected from the group consisting of beta oxy naphthoic acid, the anilide of beta oxy naphthoic acid and alkoxy substituted anilides of beta oxy naphthoic acid, and the metallized derivatives thereof with a metal of the group consisting of copper and nickel.

2. Composition as claimed in claim 1 wherein said compound is metallized with a metal selected from the group consisting of copper and nickel.

3. Composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising the compound formed by coupling tetrazotized dianisidine with the 2,5 dimethoxy anilide of beta oxy naphthoic acid.

4. Composition as claimed in claim 3 wherein said compound is metallized with a metal selected from the group consisting of copper and nickel.

5. Composition of claim 3 wherein said compound is metallized with copper.

6. Composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising the compound formed by coupling tetrazotized dianisidine with the ortho anisidide of beta oxy naphthoic acid.

7. Composition as claimed in claim 6 wherein said compound is metallized with a metal selected from the group consisting of copper and nickel.

8. Composition of claim 6 wherein said compound is metallized with copper.

9. Composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising the compound formed by coupling tetrazotized dianisidine with the anilide of beta oxy naphthoic acid.

10. Composition as claimed in claim 9 wherein said compound is metallized with a metal selected from the group consisting of copper and nickel.

11. Composition of claim 9 wherein said compound is metallized with copper.

12. Composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising a blue colorant of the group consisting of the compound formed by coupling tetrazotized dianisidine with the 2,5 dimethoxy anilide of beta oxy naphthoic acid, and the metallized derivatives thereof with a metal of the group consisting of copper and nickel.

13. Composition showing substantially the reflectance characteristics of leafy vegetation, which comprises a binder and mixture of colorants, said colorants selected so that the mixture appears to the eye and to infra-red photography to have the color of vegetable matter, the essential colorant which reproduces the spectral reflectivity of chlorophyll-bearing foliage in the wave length region from 550 to 800 mu. comprising a blue colorant of the group consisting of the compound formed by coupling tetrazotized dianisidine with the ortho anisidide of beta oxy naphthoic acid, and the metallized derivatives thereof with a metal of the group consisting of copper and nickel.

14. Composition showing substantially the reflectance characteristics of leafy vegetation, which comprises a binder and mixture of colorants, said colorants selected so that the mixture appears to the eye, and to infra-red photography to have the color of vegetable matter, the essential colorant which reproduces the spectral reflectivity of chlorophyll-bearing foliage in the wave length region from 550 to 800 mu. comprising a blue colorant of the group consisting of the compound formed by coupling tetrazotized dianisidine with the anilide of beta oxy naphthoic acid, and the metallized derivatives thereof with a metal of the group consisting of copper and nickel.

WALTER C. GRANVILLE.